(12) United States Patent
Yoshimura

(10) Patent No.: US 11,477,432 B2
(45) Date of Patent: Oct. 18, 2022

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Kazuhiro Yoshimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/818,455

(22) Filed: Mar. 13, 2020

(65) Prior Publication Data
US 2020/0329227 A1 Oct. 15, 2020

(30) Foreign Application Priority Data
Apr. 9, 2019 (JP) .............................. JP2019-074045

(51) Int. Cl.
*H04N 13/00* (2018.01)
*H04N 13/282* (2018.01)
*H04N 13/122* (2018.01)
*H04N 13/117* (2018.01)

(52) U.S. Cl.
CPC ......... *H04N 13/282* (2018.05); *H04N 13/117* (2018.05); *H04N 13/122* (2018.05)

(58) Field of Classification Search
CPC .. H04N 13/122; H04N 5/2628; H04N 13/117; H04N 13/282
See application file for complete search history.

(56) References Cited

U.S. PATENT DOCUMENTS

| 2012/0309518 | A1* | 12/2012 | Hansen ............... A63F 13/5255 463/31 |
| 2014/0292805 | A1* | 10/2014 | Yamada .................. G09G 5/00 345/629 |
| 2015/0274016 | A1* | 10/2015 | Kinoshita ............. B60K 35/00 701/36 |
| 2016/0050367 | A1* | 2/2016 | Shimauchi .......... H04N 13/282 348/36 |

(Continued)

FOREIGN PATENT DOCUMENTS

JP 2005242606 A 9/2005

OTHER PUBLICATIONS

Iwaki et al. "JP 2005-242606ATranslation". (Year: 2005).*

*Primary Examiner* — Zhihan Zhou
(74) *Attorney, Agent, or Firm* — Rossi, Kimms & McDowell LLP

(57) ABSTRACT

An information processing apparatus having: a display control unit configured to display a plurality of virtual viewpoint images respectively corresponding to a plurality of virtual viewpoints on a display unit, wherein each of the plurality of virtual viewpoint images is generated based on image data obtained by a plurality of image capturing apparatuses performing image capturing from different directions; a reception unit configured to receive an input in accordance with a user operation for changing a virtual viewpoint corresponding to one virtual viewpoint image of the plurality of virtual viewpoint images displayed on the display unit; and a viewpoint control unit configured to perform control to change a plurality of virtual viewpoints respectively corresponding to the plurality of virtual viewpoint images based on the received input.

17 Claims, 11 Drawing Sheets

(56) References Cited

U.S. PATENT DOCUMENTS

| | | | | |
|---|---|---|---|---|
| 2018/0061071 A1* | 3/2018 | Okutani | ............... | H04N 5/2224 |
| 2019/0262709 A1* | 8/2019 | Nakamura | ........... | A63F 13/2145 |
| 2020/0234495 A1* | 7/2020 | Nakao | ................ | H04N 21/6587 |

* cited by examiner

INFORMATION PROCESSING APPARATUS, INFORMATION PROCESSING METHOD AND STORAGE MEDIUM

BACKGROUND OF THE INVENTION

Field of the Invention

The present invention relates to a technique for generating a virtual viewpoint image.

Description of the Related Art

In recent years, a technique is known, which generates and displays a virtual viewpoint image in accordance with an arbitrary viewpoint, not only an image at a camera arrangement position, by arranging a plurality of cameras at different positions, performing synchronous image capturing from a plurality of viewpoints, and using a multi-viewpoint image obtained by the image capturing.

As regards the technique such as this, Japanese Patent Laid-Open No. 2005-242606 has disclosed a technique to generate a plurality of virtual viewpoint images and simultaneously display the generated plurality of virtual viewpoint images in order to improve the degree of scene understanding of a viewer.

In the technique disclosed in Japanese Patent Laid-Open No. 2005-242606, the plurality of virtual viewpoint images is generated based on virtual viewpoint information (that is, the position, the orientation, and the like of the virtual viewpoint) determined in advance, and therefore, the virtual viewpoint images whose interactivity is low are displayed as a result. Consequently, in the technique disclosed in Japanese Patent Laid-Open No. 2005-242606, in a case where it is made possible for a viewer to specify the virtual viewpoint information in order to improve interactivity, it is complicated and difficult for a viewer to specify the virtual viewpoint information for each of the plurality of virtual viewpoint images.

SUMMARY OF THE INVENTION

The information processing apparatus according to the present invention is an information processing comprising: a display control unit configured to display a plurality of virtual viewpoint images respectively corresponding to a plurality of virtual viewpoints on a display unit, wherein each of the plurality of virtual viewpoint images is generated based on image data obtained by a plurality of image capturing apparatuses performing image capturing from different directions; a reception unit configured to receive an input in accordance with a user operation for changing a virtual viewpoint corresponding to one virtual viewpoint image of the plurality of virtual viewpoint images displayed on the display unit; and a viewpoint control unit configured to perform control to change a plurality of virtual viewpoints respectively corresponding to the plurality of virtual viewpoint images based on the received input.

Further features of the present invention will become apparent from the following description of exemplary embodiments with reference to the attached drawings.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention. In addition, as a supplement, explanation is given by attaching the same symbol to the same configuration.

First Embodiment

In the present embodiment, an example is explained in which a plurality of virtual viewpoint images is displayed simultaneously in the same scene and by operating a virtual camera in one virtual viewpoint image of the displayed virtual viewpoint images, a virtual camera in another virtual viewpoint image is operated.

The virtual viewpoint image that is generated in the present embodiment may be a moving image (video image) or a still image and here, explanation is given by taking a virtual viewpoint video image as an example of a virtual viewpoint image. This also applies to each of the following embodiments.

Further, the virtual viewpoint video image refers to a video image including images generated based on a plurality of captured images acquired by a plurality of cameras (image capturing apparatuses) that capture the field, which is an image capturing area, from different directions, and generated in accordance with the position, the orientation, and the like of a virtual camera. The virtual camera is a virtual camera different from a plurality of image capturing apparatuses arranged actually around the image capturing area and is a concept for explaining a virtual viewpoint relating to generation of a virtual viewpoint image in a convenient manner. That is, it is possible to regard the virtual viewpoint image as an image captured from a virtual viewpoint set within a virtual space in association with the image capturing area. Then, it is possible to represent the position and the orientation of the viewpoint in the virtual image capturing as the position and the orientation of the virtual camera. In other words, the virtual viewpoint image can be said as an image that simulates, in a case where it is assumed that a camera exists at the position of a virtual viewpoint set within a space, a captured image obtained by the camera. However, using the concept of the virtual camera in order to implement the configuration of the present embodiment is not indispensable. In addition, in the present embodiment, the virtual viewpoint video image may be video image data in which each image frame is compressed by a predetermined moving image compression method, video image data in which each image frame is compressed by a predetermined still image compression method, or non-compressed video image data.

Figure 1:
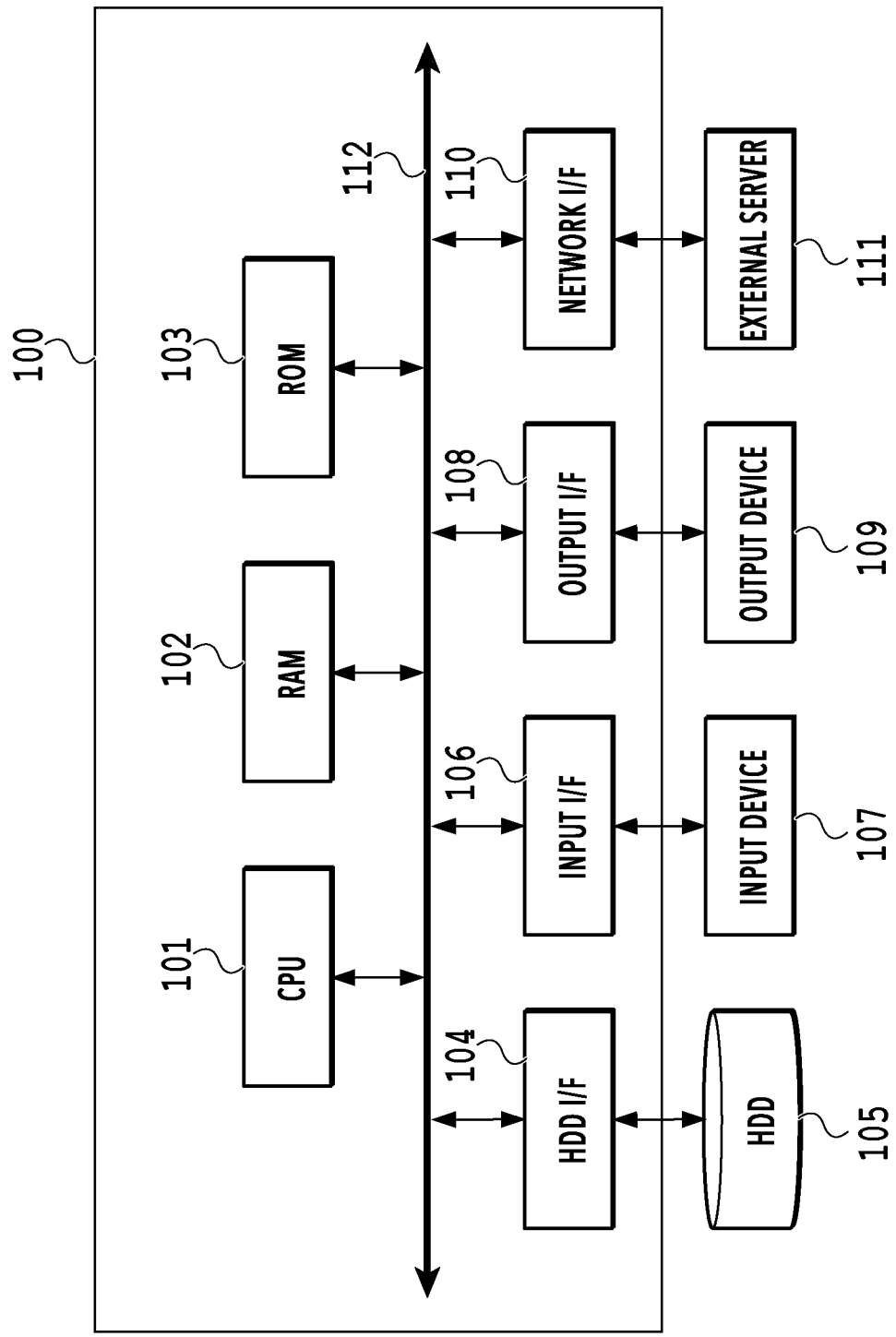
FIG. 1 is a diagram showing a hardware configuration of a display control apparatus.

First, by using FIG. 1, the hardware configuration of a display control apparatus 100 according to the present embodiment is explained. As shown in FIG. 1, the display control apparatus 100 comprises a CPU 101, a RAM 102, a ROM 103, an HDD interface 104, an input interface 106, an output interface 108, and a network interface 110.

The CPU 101 controls each configuration, to be described later, via a system bus 112 by executing programs stored in at least one of the ROM 103 or a hard disk drive (HDD) 105 by using the RAM 102 as a work memory. Further, due to this, a variety of pieces of processing, to be described later, are performed.

The HDD interface (I/F) 104 is an interface, for example, such as a serial ATA (SATA), which connects the display control apparatus 100 and a secondary storage device, such as the HDD 105 and an optical disc drive. The CPU 101 reads data from the HDD 105 via the HDD I/F 104 and further, loads data stored in the HDD 105 onto the RAM 102. Further, the CPU 101 saves various kinds of data acquired by executing programs and stored in the RAM 102 in the HDD 105 via the HDD I/F 104.

The input interface (I/F) 106 connects the display control apparatus 100 and an input device 107, such as a keyboard, a mouse, a digital camera, and a scanner. The input I/F 106 is a serial bus interface, for example, such as USB and IEEE 1394. It is possible for the CPU 101 to read various kinds of data from the input device 107 via the input I/F 106.

The output interface (I/F) 108 connects the display control apparatus 100 and an output device 109, for example, such as a display. The output I/F 108 is a video image output interface, for example, such as DVI (Digital Visual Interface) and HDMI (registered trademark) (High-Definition Multimedia Interface). It is possible for the CPU 101 to display a virtual viewpoint video image by transmitting data relating to a virtual viewpoint video image to the output device 109 via the output I/F 108.

The network interface (I/F) 110 connects the display control apparatus 100 and an external server 111. The network I/F 110 is a network card, for example, such as a LAN card. It is possible for the CPU 101 to read various kinds of data from the external server 111 via the network I/F 110.

In FIG. 1, the example is shown in which the HDD 105, the input device 107, and the output device 109 are configured as devices different from the display control apparatus 100, but the example is not necessarily limited to this. Consequently, the display control apparatus 100 may be a smartphone or the like and in this case, the input device 107 and the output device 109 are configured integrally with the display control apparatus 100 as a touch-sensitive panel and a display screen, respectively. Further, it is also possible to use a built-in device of the HDD 105 as the display control apparatus 100.

In addition, all the configurations shown in FIG. 1 are not necessarily indispensable for the configuration. For example, in a case where a virtual viewpoint video image stored in the HDD 105 is reproduced, the external server 111 is no longer necessary. Further, on the contrary, in a case where a virtual viewpoint video image acquired from the external server 111 is reproduced, the HDD 105 is no longer necessary. In addition, the display control apparatus 100 may comprise a plurality of the CPUs 101. Further, it may also be possible to comprise one or a plurality of pieces of dedicated hardware different from the CPU 101 or a GPU (Graphics Processing Unit) and for the dedicated hardware or the GPU to perform at least part of the processing by the CPU 101. As the dedicated hardware, for example, there are ASIC (Application Specific Integrated Circuit), FPGA (Field-Programmable Gate Array), DSP (Digital Signal Processor), and the like.

Figure 2:
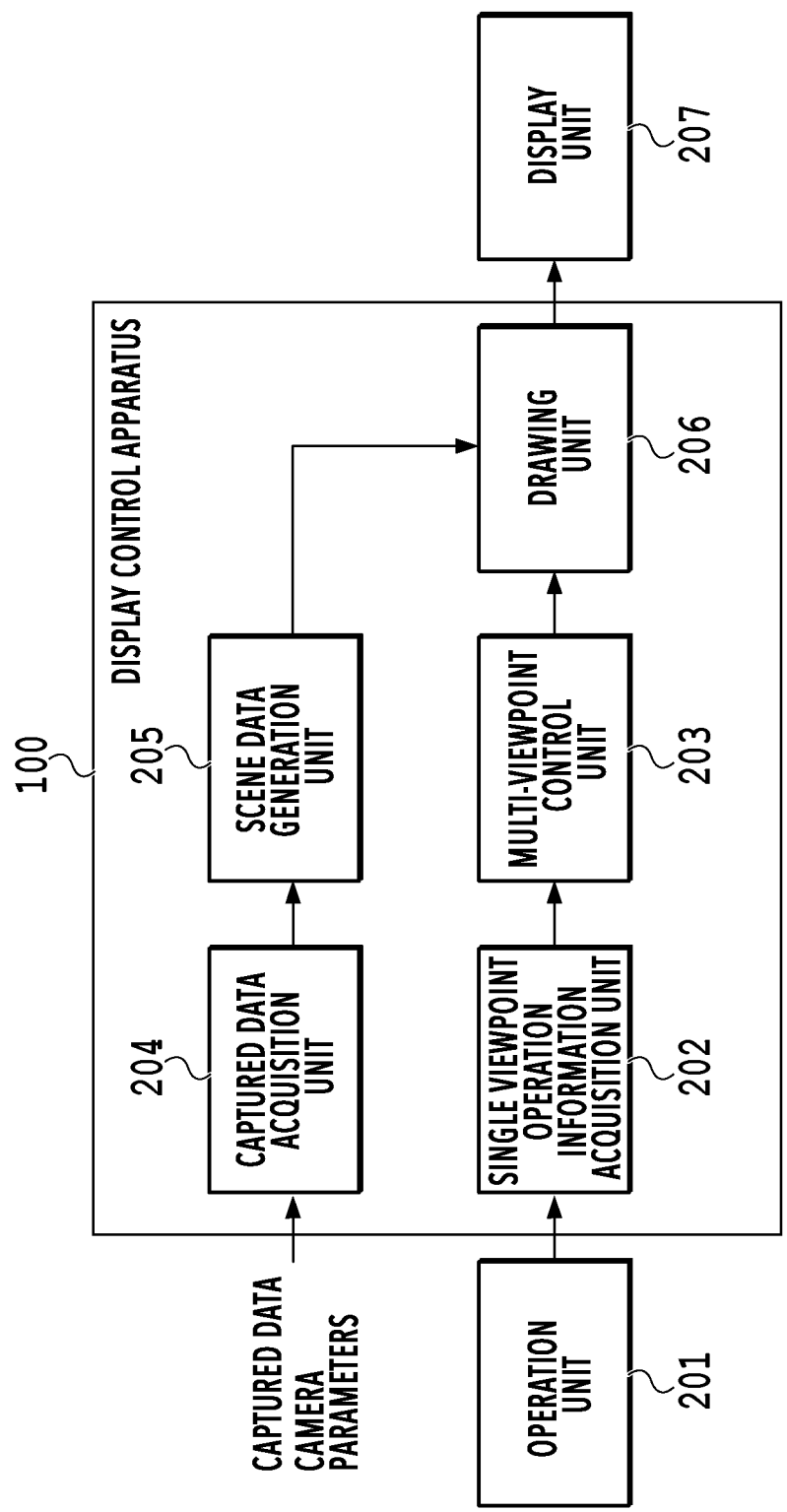
FIG. 2 is a diagram showing a function configuration of the display control apparatus.
Figure 3:
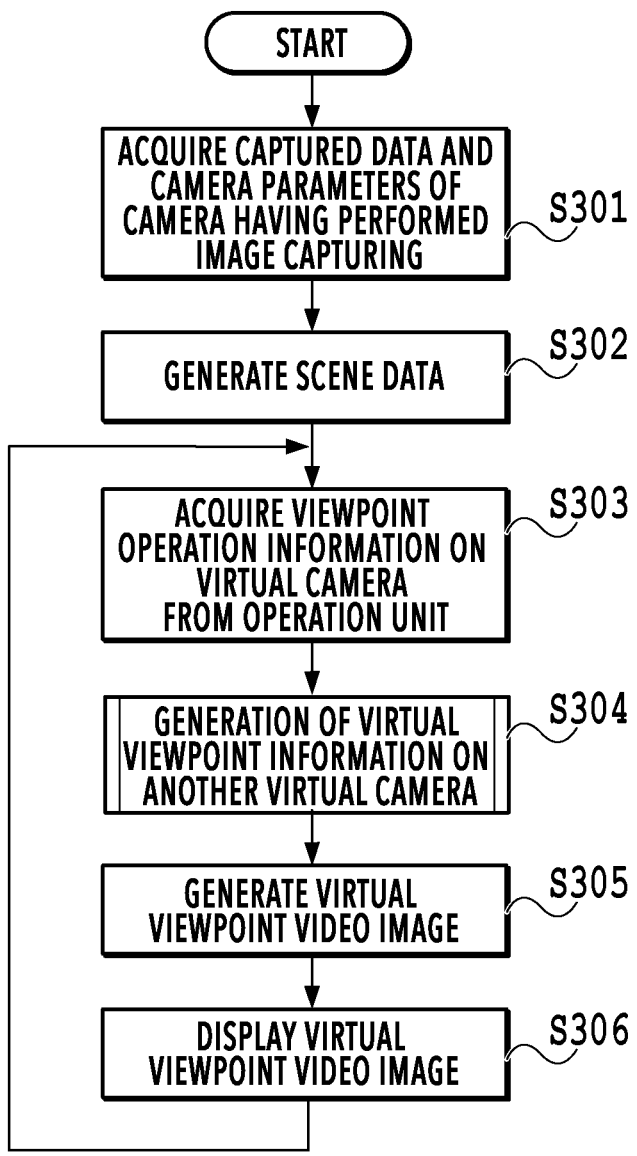
FIG. 3 is a flowchart showing a procedure of processing performed by the display control apparatus.

Next, by using FIG. 2 and FIG. 3, processing performed by the display control apparatus 100 is explained. Specifically, processing is explained, which determines, based on the position and the orientation of a virtual camera in a virtual viewpoint video image, which is specified as a reference by a viewer, the position and the orientation of a virtual camera in another virtual viewpoint video image so that it is possible for the viewer to easily specify the position and the orientation of a plurality of virtual cameras. In the following, the virtual camera as a reference in the virtual viewpoint video image is simply referred to as a reference virtual camera and the virtual camera in another virtual viewpoint video image is simply referred to as another virtual camera.

FIG. 2 is a diagram showing the function configuration of the display control apparatus 100. The display control apparatus 100 comprises a single viewpoint operation information acquisition unit 202, a multi-viewpoint control unit 203, a captured data acquisition unit 204, a scene data generation unit 205, and a drawing unit 206. For the single display control apparatus 100 to have all these components is not indispensable. For example, it may also be possible for an information processing apparatus having the single viewpoint operation information acquisition unit 202 and the multi-viewpoint control unit 203 and for a display control apparatus having the captured data acquisition unit 204, the scene data generation unit 205, and the drawing unit 206 to be connected to each other as separate apparatuses. Further, to the display control apparatus 100, as shown in FIG. 2, an operation unit 201 corresponding to the input device 107 in FIG. 1 and a display unit 207 corresponding to the output device 109 in FIG. 1 are connected, respectively. The CPU 101 plays the role of each function block inside the display control apparatus 100 shown in FIG. 2 by reading a program stored in at least one of the ROM 103 or the HDD 105 and executing the program by using the RAM 102 as a work area. It is not necessary for the CPU 101 to play the role of all the function blocks inside the display control apparatus 100 and it may also be possible to provide a dedicated processing circuit corresponding to each function block.

FIG. 3 is a flowchart showing a procedure of processing performed by the display control apparatus 100. Each piece of processing shown in FIG. 3 is implemented by the CPU 101 reading a program stored in at least one of the ROM 103 or the HDD 105 and executing the program by using the RAM 102 as a work area. Further, it is assumed that symbol "S" in the explanation of the flowchart represents a step. This also applies to the explanation of the following flowcharts.

At S301, the captured data acquisition unit 204 acquires the captured data corresponding to the frame for which a virtual viewpoint video image is generated and the camera parameters of the camera having captured the captured data from the HDD 105 or the external server 111 and outputs them to the scene data generation unit 205. The camera parameters that are acquired here refer to the external parameters and the internal parameters of the camera having performed the image capturing.

At S302, the scene data generation unit 205 generates scene data necessary for rendering of a virtual viewpoint video image based on the captured data and the camera parameters, which are acquired. Here, the scene data is, in the present embodiment, 3D polygon data, texture data, and a UV map and further, the UV map causes the 3D polygon data and the texture data to correspond to each other.

Figures 4A, 4B, 4C, 4D, 4E:
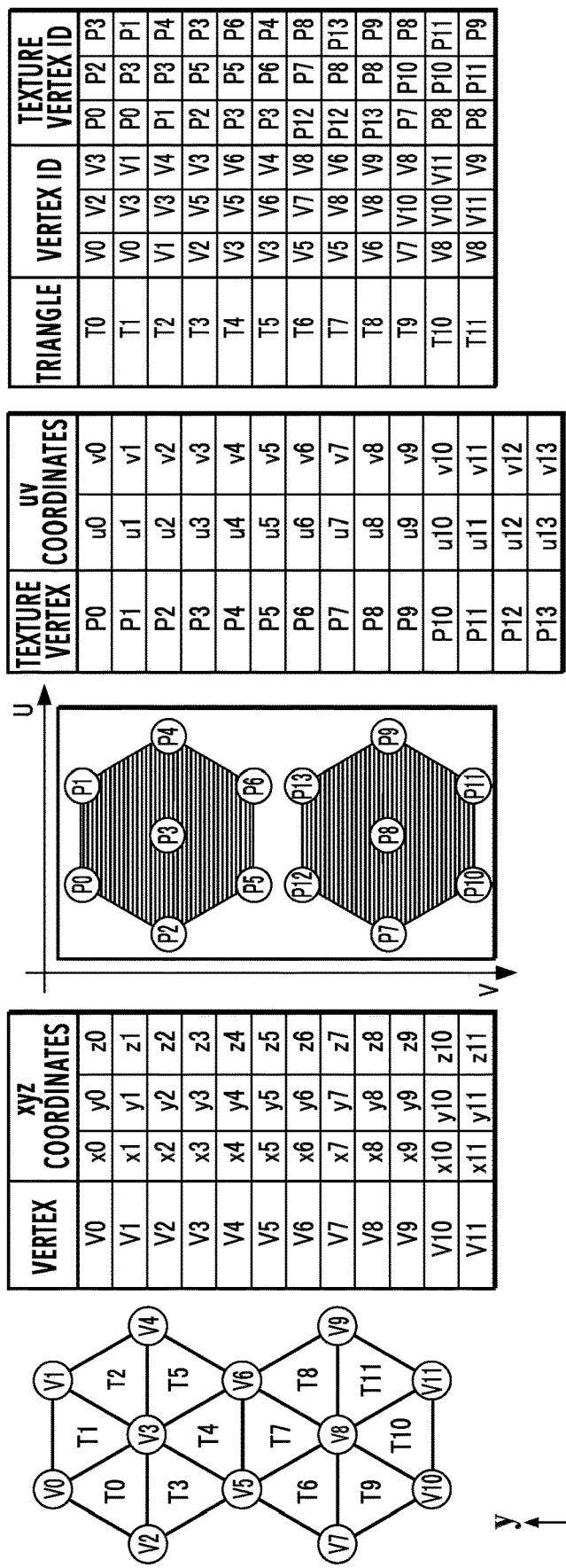
FIG. 4A is a diagram showing 3D polygon data.
FIG. 4B is a diagram showing 3D polygon data.
FIG. 4C is a diagram showing texture data.
FIG. 4D is a diagram showing texture data.
FIG. 4E is a diagram showing a UV map.

In the following, by using FIG. 4A to FIG. 4E, the scene data is explained supplementally. FIG. 4A and FIG. 4B are diagrams showing 3D polygon data. FIG. 4A shows triangles T0 to T11 in a three-dimensional space and vertexes V0 to V11 configuring the triangles T0 to T11 and further, FIG. 4B shows three-dimensional coordinates of the vertexes V0 to V11. FIG. 4C and FIG. 4D are diagrams showing texture data. FIG. 4C shows positions P0 to P13 corresponding to the vertexes of the triangles on the texture image and further, FIG. 4D shows two-dimensional coordinates of the texture vertexes P0 to P13. FIG. 4E is a diagram showing a UV map and is a correspondence table between a vertex ID on the three-dimensional space, which configures those triangles and a texture vertex ID on a texture image space for each triangle. As shown in the UV map in FIG. 4E, by giving a correspondence between the vertex of the triangle configuring the 3D polygon in FIG. 4A and the vertex of the triangle on the texture image in FIG. 4C, it is possible to append a texture to the shape.

The scene data generation unit 205 generates the scene data for each object within the scene. First, the scene data generation unit 205 generates 3D polygon data. In order to generate 3D polygon data, in the present embodiment, the scene data generation unit 205 acquires voxel information by applying the Visual Hull algorithm and reconstructs the 3D polygon.

However, the reconstruction method of the 3D polygon is not necessarily limited to this and for example, it may also be possible to directly transform voxel information into a polygon model and the like. In addition, it may also be possible to apply PSR (Poisson Surface Reconstruction) to a point cloud acquired from a depth map acquired by using an infrared sensor. As the method of acquiring a point cloud, for example, it is possible to use a method of acquiring a point cloud by stereo matching making use of the image feature, represented by PMVS (Patch-based Multi-view Stereo) and the like.

Next, the scene data generation unit 205 generates texture data. The scene data generation unit 205 calculates corresponding UV coordinates by projecting the vertexes V0 to V11 of each triangle configuring the 3D polygon onto the image capturing camera based on the camera parameters and registers the area surrounded by three points projected onto the image as a texture image. In this case, it may also be possible to register the average of the areas acquired by all the cameras as a texture image, or select a specific camera and register the area of the selected camera as a texture image.

Then, the scene data generation unit 205 generates texture data and at the same time, generates a UV map corresponding to the texture data. The scene data generation unit 205 outputs the generated scene data to the drawing unit 206.

At S303, the single viewpoint operation information acquisition unit 202 acquires viewpoint operation information relating to the position, the orientation, and the like of the virtual camera as the input in accordance with the user operation from the operation unit 201 and outputs the viewpoint operation information to the multi-viewpoint control unit 203. The viewpoint operation information is generated based on the viewpoint operation by a viewer. Further, it is assumed that the viewpoint operation information acquired by the single viewpoint operation information acquisition unit 202 is viewpoint operation information on the virtual camera that is taken as a reference.

In the following, as regards the viewpoint operation information, explanation is supplemented by using a case as an example where a viewer operates the position and the orientation of the virtual viewpoint by using a touch-sensitive panel on which a virtual viewpoint video image is displayed. The viewpoint operation information indicates a number of points n, which are touched on the touch-sensitive panel, two-dimensional screen coordinates $x_i$ (i=1 to n) of the touched point, two-dimensional screen coordinates x' of a representative point of the touched points, and a two-dimensional vector $d=(d_y, d_x)$ indicating the amount of movement of the representative point from the previous frame. However, the contents of the viewpoint operation information are not limited to these and for example, the information indicating x' and d may not be included in the viewpoint operation information.

The coordinate system of the two-dimensional screen coordinates is a coordinate system in which the origin is set at the top left of the two-dimensional screen in FIG. 5A to FIG. 5D, to be described later, the horizontal direction is taken as an x-axis (the rightward direction of the two-dimensional screen is positive), and the vertical direction is taken as a y-axis (the downward direction of the two-dimensional screen is positive). Further, it is assumed that the representative point is the centroid of the two-dimensional screen coordinates $x_i$ of the touched point. However, the representative point is not limited to the centroid of the two-dimensional screen coordinates $x_i$ of the touched point and it may also be possible to select the average position of the two-dimensional screen coordinates $x_i$, one point selected randomly from the two-dimensional screen coordinates $x_i$, or the point that is touched for the longest time.

In addition, it may also be possible to switch the viewpoint operation methods in accordance with the number of points at which the touch-sensitive panel is touched (that is, the number of fingers). For example, in a case where the number of touched points is zero, it is regarded that there is no operation by a viewer. In a case where the number of touched points is one, the operation is regarded as the operation by the rotation operation of the virtual viewpoint with the object captured at the screen center being as the rotation center. In a case where the number of touched points is two, the operation is regarded as the pinch-in operation or the pinch-out operation for displaying an object in an enlarged/reduced manner by moving the viewpoint of the virtual camera in the forward or the backward direction. In addition, the viewpoint operation by a viewer is not limited to the operation using the touch-sensitive panel and for example, it may also be possible to perform the operation by using a mouse.

At S304, the multi-viewpoint control unit 203 controls the viewpoint of each virtual camera based on the viewpoint operation information on the reference virtual camera, which is acquired by the single viewpoint operation information acquisition unit 202. Specifically, the multi-viewpoint control unit 203 generates virtual viewpoint information indicating the position, the orientation, and the like of each virtual camera based on the viewpoint operation information on the reference virtual camera.

The virtual viewpoint information that is generated here refers to the external parameters and the internal parameters of the virtual camera. The external parameters of the virtual camera are parameters indicating the position and the orientation of the virtual camera and the internal parameters of the virtual camera are parameters indicating the optical characteristics of the virtual camera. In the following, the external parameters and the internal parameters of the virtual camera are explained supplementally.

In a case where it is assumed that a vector indicating the position of the virtual camera is t and a matrix representing a rotation is R, the external parameters of the virtual camera are expressed as the following formula. Here, it is assumed that the coordinate system is a left-handed coordinate system, the horizontal direction at the viewpoint of the virtual camera is the x-axis (the rightward direction is positive), the vertical direction is the y-axis (the upward direction is positive), and the forward/backward direction is the z-axis (the forward direction is positive).

$$\begin{bmatrix} R & t \\ 0 & 1 \end{bmatrix} \quad \text{formula (1)}$$

Further, internal parameters K of the virtual camera are expressed as the following formula in a case where the main point position of the image is taken as ($c_x$, $c_y$) and the focal length of the camera is taken as f.

$$K = \begin{bmatrix} f & 0 & c_x \\ 0 & f & c_y \\ 0 & 0 & 1 \end{bmatrix} \quad \text{formula (2)}$$

The focal length of the virtual camera is an example of information indicating the magnitude of the viewing angle corresponding to the virtual viewpoint. The representation method of the camera parameters is not necessarily limited to this and the representation method may be one other than a matrix. Consequently, for example, it may also be possible to indicate the position of the virtual camera by three-dimensional coordinates and indicate the orientation of the virtual camera by the enumeration of the values of yaw, roll, and pitch. Further, the external parameters and the internal parameters are not necessarily limited to those described above. Consequently, for example, it may also be possible to acquire information indicating a zoom value of the virtual camera as the internal parameter of the virtual camera, which indicates the magnitude of the viewing angle corresponding to the virtual viewpoint.

At S305, the drawing unit 206 generates a virtual viewpoint video image based on the scene data generated by the scene data generation unit 205 and a plurality of pieces of virtual viewpoint information acquired by the multi-viewpoint control unit 203 and outputs the generated plurality of virtual viewpoint video images to the display unit 207. That is, the drawing unit 206 is an example of an image generation unit configured to generate a virtual viewpoint video image (image). As regards generation of a virtual viewpoint video image, the already-known technique (generation method) is used and here, explanation thereof is omitted. At S306, the display unit 207 displays the plurality of virtual viewpoint video images acquired from the drawing unit 206. As above, the procedure of the processing performed by the display control apparatus 100 is explained and in the flowchart in FIG. 3, for example, in a case where there are instructions relating to termination of browsing of a virtual viewpoint image by a viewer, or the like, the processing shown in FIG. 3 is terminated.

(Virtual Viewpoint Control Method)

Here, the control method of a viewpoint of another virtual camera is explained. Before explaining the control method of a viewpoint of another virtual camera, first, a use example of the display control apparatus 100 by a user is explained by using FIG. 5A to FIG. 5D. FIG. 5A to FIG. 5D each show an example in which the touch-sensitive panel and the display screen are configured integrally with the display control apparatus 100.

In FIG. 5A to FIG. 5D, a virtual viewpoint video image 501 and a virtual viewpoint video image 502 are displayed on the display screen and a viewer specifies the position and the orientation of the virtual camera by operating the touch-sensitive panel with his/her finger(s). Further, on the display screen, a checkbox 503 is displayed. The checkbox 503 is a checkbox for selecting "viewpoint operation interlocking (that is, whether or not the viewpoint operation is interlocked with the viewpoint of another virtual camera)". In a case where the checkbox 503 is checked, on a condition that a viewer performs the viewpoint operation for one of the virtual cameras, the viewpoint of the other virtual camera is operated in an interlocking manner.

Figure 5A:
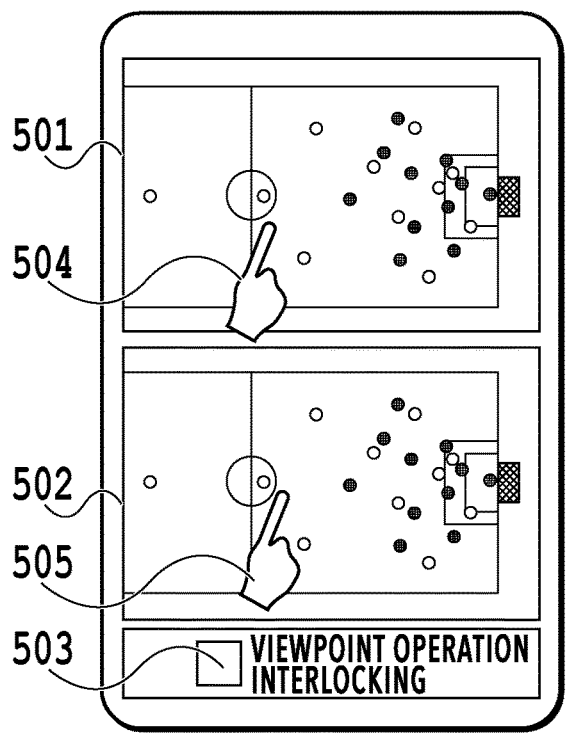
FIG. 5A to FIG. 5D are each a diagram showing a use example of the display control apparatus.

In FIG. 5A, the initial state of the display screen is shown. In FIG. 5A, the checkbox 503 is not checked, and therefore, the viewpoint operation is not in the interlocked state and it is possible for a viewer to perform the viewpoint operation independently for the virtual viewpoint video image 501 and the virtual viewpoint video image 502. Further, as regards the virtual viewpoint video image 501 and the virtual viewpoint video image 502, both the virtual cameras are in the state where the initial setting (default setting) is set, and therefore, the same virtual viewpoint video image is displayed. In this state, in a case where a viewer performs the viewpoint operation of the virtual viewpoint video image 501 with a finger 504 and performs the viewpoint operation of the virtual viewpoint video image 502 with a finger 505, the results of performing both the viewpoint operations will be as shown in FIG. 5B.

Figure 5B:
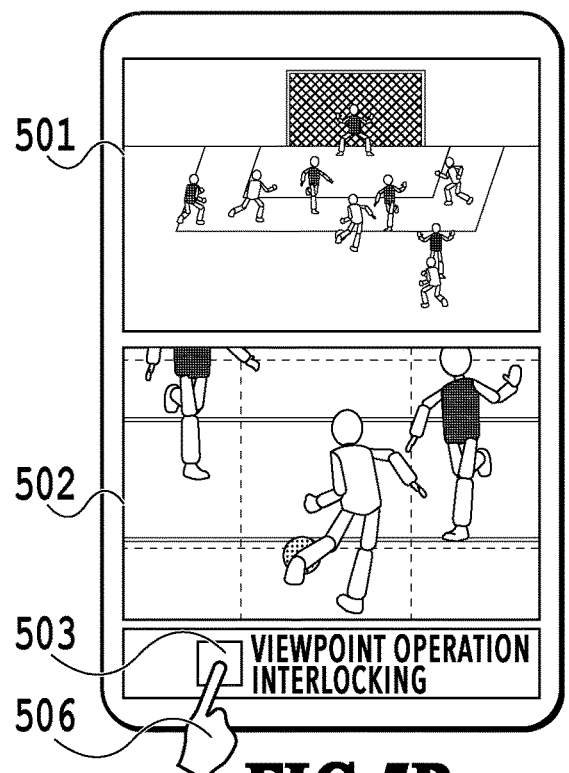

In FIG. 5B, the virtual viewpoint video image 501 is a virtual viewpoint video image of a wide range in which nine players with a player who is about to shoot as a center are included within the viewing angle and the virtual viewpoint video image 502 is a virtual viewpoint video image of a narrow range in which the player whose full body is included in the viewing angle is only the player who is about to shoot. Then, in a case where a viewer completes the viewpoint operation for the virtual viewpoint video image 501 and the virtual viewpoint video image 502, respectively, and then checks the checkbox 503 with a finger 506, the display screen will be shown as in FIG. 5C.

Figure 5C:
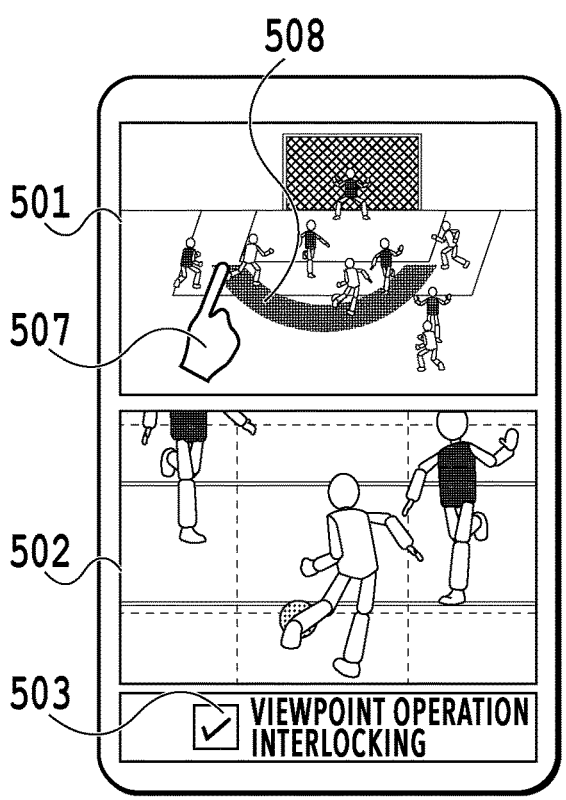

In FIG. 5C, the state where the checkbox 503 is checked is shown. In this state, a viewer further performs the viewpoint operation only for the virtual viewpoint video image 501. Specifically, a viewer moves the virtual viewpoint (virtual camera) along a belt 508 with a finger 507 so as to change the viewpoint that captures the backside of the player who is about to shoot to the viewpoint that captures the right side of the player who is about to shoot. In a case where the viewpoint operation such as this is performed for the virtual viewpoint video image 501 in the state where the checkbox 503 is checked, the viewpoint of the virtual camera of the virtual viewpoint video image 502 is also changed in an interlocking manner with the change in the viewpoint of the virtual camera of the virtual viewpoint video image 501 and the display screen will be shown as in FIG. 5D.

Figure 5D:
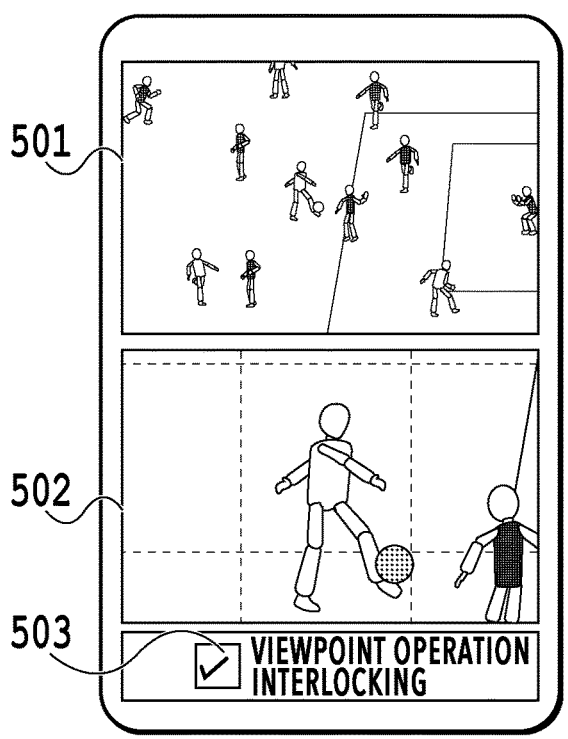

In FIG. 5D, the state is displayed on the display screen where the virtual viewpoint video image 501 and the virtual viewpoint video image 502 whose viewpoints of the virtual cameras are changed so as to capture the player who is about to shoot from the right side are shown. That is, in FIG. 5D, both the viewpoint of the virtual camera of the virtual viewpoint video image 501 and the viewpoint of the virtual camera of the virtual viewpoint video image 502 are changed so as to capture the player who is about to shoot from the right side.

As described above, by operating one viewpoint (that is, the viewpoint of the virtual camera in the virtual viewpoint video image 501), it is also possible to control another viewpoint (that is, the viewpoint of the virtual camera in the virtual viewpoint video image 502). In the example described above, in response to that the touch operation is performed for the area (upper side of the display unit) in which the virtual viewpoint video image 501 is displayed in a case where the viewpoint operation interlocking is valid, the virtual viewpoint corresponding to the virtual viewpoint video image 501 and the virtual viewpoint corresponding to the virtual viewpoint video image 502 are changed. On the other hand, it may also be possible to design the display screen so that also in a case where the touch operation for the area (lower side of the display unit) in which the virtual viewpoint video image 502 is displayed is performed, similarly, the virtual viewpoint corresponding to the virtual viewpoint video image 501 and the virtual viewpoint corresponding to the virtual viewpoint video image 502 are changed. Further, in the present embodiment, the "viewpoint operation interlocking" is selected in the checkbox. That is, whether one virtual viewpoint is changed or a plurality of viewpoints is changed in response to the operation for changing the viewpoint is determined based on the selection operation for the displayed checkbox. However, this is not limited and any aspect may be accepted as long as it is possible to explicitly change between interlocking and non-interlocking of the viewpoint operation. For example, an aspect may be accepted in which a user is caused to select a viewpoint (virtual viewpoint video image) whose viewpoint operation is interlocked in place of the checkbox as shown in FIG. 5A to FIG. 5D on the premise that a predetermined target viewpoint of other viewpoints is interlocked with the viewpoint operation for one viewpoint.

In FIG. 5A to FIG. 5D, the example is shown in which the screen including the virtual viewpoint image is displayed in the portable tablet terminal and in response to the touch operation for the tablet terminal, the virtual viewpoint is controlled. However, the configuration of the system that controls the virtual viewpoint is not limited to this. For example, it may also be possible to use a stationary large-sized screen display including a touch-sensitive panel in place of the tablet terminal. Further, it may also be possible to control the virtual viewpoint in response to the pointing operation using a mouse connected to a PC, the operation to press a button of a remote controller, and the like, not limited to the touch operation for the touch-sensitive panel. Furthermore, it may also be possible to display a plurality of virtual viewpoint images in different display devices, respectively, and change the virtual viewpoint corresponding to the plurality of virtual viewpoint images in response to the single user operation.

Figure 6:
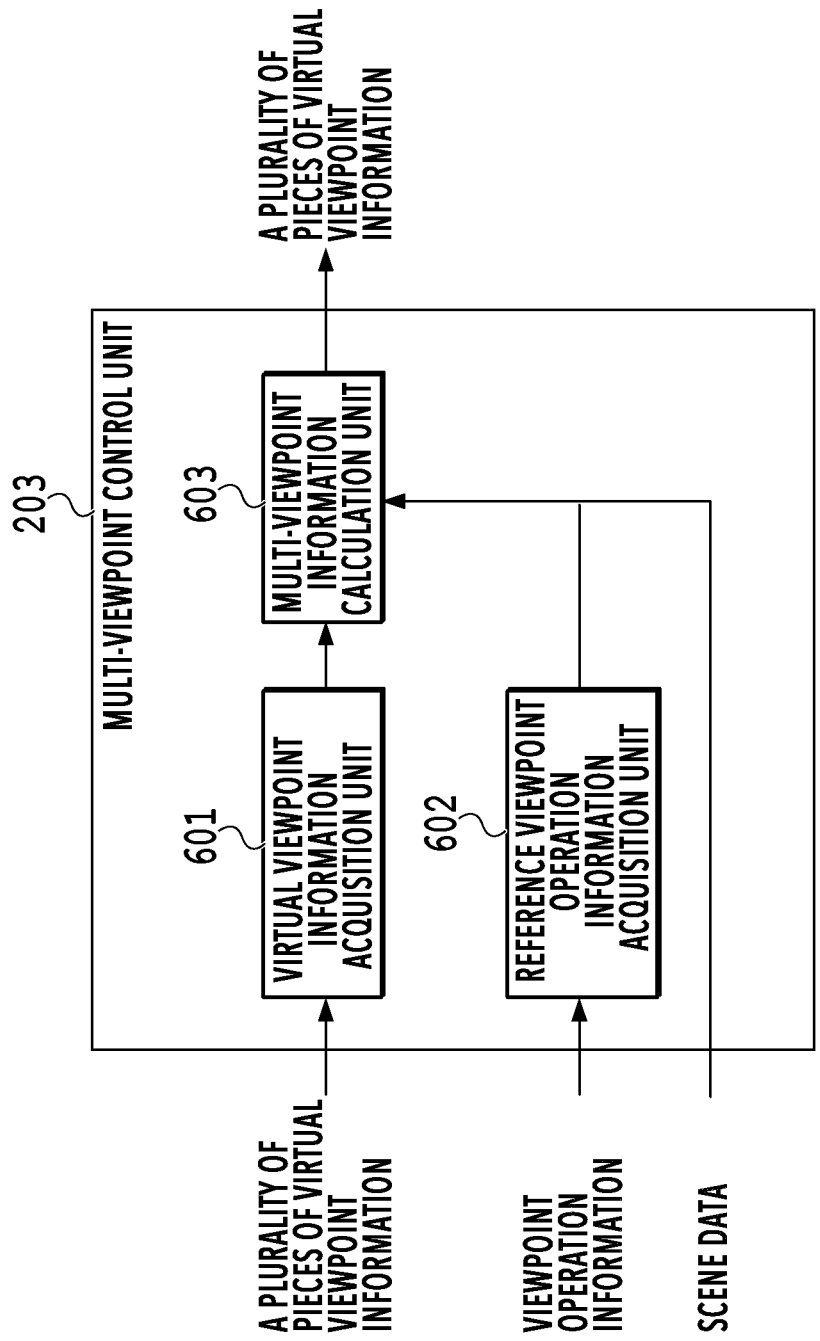
FIG. 6 is a diagram showing a function configuration of a multi-viewpoint control unit.
Figure 7:
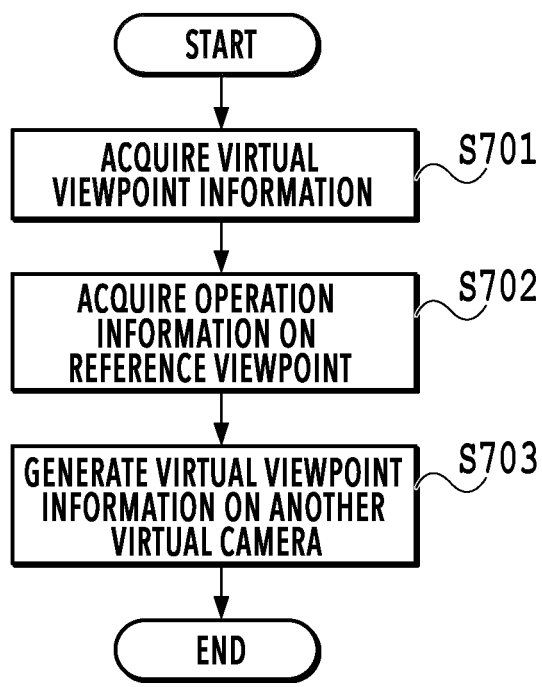
FIG. 7 is flowchart showing a procedure of processing to generate virtual viewpoint information on another virtual camera.

Next, the control method of a viewpoint of another virtual camera (generation method of virtual viewpoint information on another virtual camera) is explained by using FIG. 6 and FIG. 7. FIG. 6 is a block diagram showing the function configuration of the multi-viewpoint control unit 203 and FIG. 7 is a flowchart showing a procedure of the processing at S304 in FIG. 3 described above.

At S701, a virtual viewpoint information acquisition unit 601 acquires virtual viewpoint information (that is, external parameters and internal parameters) on a plurality of displayed virtual viewpoint video images. The virtual viewpoint information that is acquired here is the external parameters and the internal parameters indicating the state of the virtual viewpoint video image 501 and the external parameters and the internal parameters indicating the state of the virtual viewpoint video image 502 in FIG. 5B in the example described above. The virtual viewpoint information acquisition unit 601 outputs the acquired plurality of pieces of virtual viewpoint information to a multi-viewpoint information calculation unit 603.

At S702, a reference viewpoint operation information acquisition unit 602 acquires the operation information on a viewpoint of a virtual camera, which is taken as a reference, of one of a plurality of displayed virtual viewpoint video images (hereinafter, referred to as a reference viewpoint). In the present embodiment, by taking a viewpoint operated actually by a viewer with a finger as a reference viewpoint, the viewpoint operation performed for the virtual viewpoint video image relating to the reference viewpoint is developed (reflected) in another virtual viewpoint video image. The operation information that is acquired here is the information relating to the operation with the finger 507 of a viewer (that is, the belt 508) in the virtual viewpoint video image 501 in FIG. 5C in the example described above. Here, the viewpoint operation information is the number of points n, which are touched on the touch-sensitive panel, the two-dimensional screen coordinates $x_i$ (i=1 to n) of the touched points, the two-dimensional screen coordinates x' of the representative point, and the two-dimensional vector $d=(d_x, d_y)$ indicating the amount of movement of the representative point from the previous frame. The reference viewpoint operation information acquisition unit 602 outputs the acquired viewpoint operation information on the reference viewpoint to the multi-viewpoint information calculation unit 603.

At S703, the multi-viewpoint information calculation unit 603 calculates (derives) anew and updates the virtual viewpoint information on the reference viewpoint and the virtual viewpoint information on another virtual camera based on the acquired viewpoint operation information on the reference viewpoint.

First, the method of calculating virtual viewpoint information on the reference viewpoint is explained. Here, as in the use example explained in FIG. 5A to FIG. 5D, a case where the reference viewpoint is rotated is explained as an example. In a case where the reference viewpoint is rotated, the number of touched points of the touch-sensitive panel is one (n=1).

First, the multi-viewpoint information calculation unit 603 finds three-dimensional coordinates of a rotation base point C in the virtual viewpoint operation. The rotation base point C is an example of the reference position within a three-dimensional space. In the present embodiment, based on the virtual viewpoint information on the reference viewpoint, a ray is cast (raycast is performed) in the three-dimensional space by taking the image center of the reference viewpoint as the start point and the point at which the ray hits an object within the scene is taken as the rotation base point C and the three-dimensional coordinates thereof are found. That is, the rotation base point C is the three-dimensional position of the object located at the center of the virtual viewpoint image corresponding to the reference viewpoint. The method of finding the three-dimensional coordinates of the rotation base point is not limited to this and for example, it may also be possible to perform the raycast of the point at which the finger touches in the three-dimensional space and take the point at which the ray hits the object within the scene as the rotation base point and find the three-dimensional coordinates thereof. Alternatively, it may also be possible to set a certain specific three-dimensional point located within the scene as the rotation base point at all times.

Next, a rotation amount θ of the reference viewpoint is calculated. In the present embodiment, in order to rotate the reference viewpoint smoothly without being affected by the shaking of the touched point, the rotation direction is limited only to the horizontal direction and the rotation amount θ [degree] in the horizontal direction is calculated as the following formula by multiplying the amount of movement $d_x$ of the representative point by a scale coefficient s.

$$\theta = s \times d_x \qquad \text{formula (3)}$$

The scale coefficient s is expressed as the following formula by taking the resolution of the touch-sensitive panel screen as a width of w pixels and the rotation amount in a case where the touched point is slid from one end of the screen up to the other end as 360 degrees.

$$s = \frac{w}{360} \qquad \text{formula (4)}$$

Further, as a supplement, here, explanation is Liven by limiting the rotation direction only to the horizontal direction, but it may also be possible to fix the rotation direction only to the vertical direction, or determine the rotation direction in accordance with the movement of the representative point in the several frames after the touch is started. Consequently, for example, the amounts of movement in the several frames are added and the amount of movement in the x-direction and that in the y-direction are compared and in a case where the amount of movement in the x-direction is larger, it may be possible to set the horizontal direction as the rotation direction and in a case where the amount of movement in the y-direction is larger, it may be possible to set the vertical direction as the rotation direction. In addition, as regards the scale coefficient s, the calculation method is not limited to the above-described calculation method and for example, it may also be possible for a user to directly set a numerical value as a sensitivity parameter of the operation.

Next, based on the rotation base point C and the amount θ of rotation, which are calculated, the position and orientation of the reference viewpoint after the viewpoint operation (new position and orientation of the reference viewpoint) is calculated. A position $t_i$ and an orientation $P_i$ of the reference viewpoint after the viewpoint operation are expressed as the following formulas in a case where a position $t_{i-1}$ and an orientation $P_{i-1}$ of the reference viewpoint before the viewpoint operation, which are acquired by the virtual viewpoint information acquisition unit 601, are rotated by θ only in the horizontal direction with the rotation base point C as a center.

$$t_i = R(\theta, O)(t_{i-1} - C) + C \qquad \text{formula (5)}$$

$$P_i = R(\theta, O) P_{i-1} \qquad \text{formula (6)}$$

Here, R (θ, Φ) is a rotation matrix that rotates the position and orientation by θ in the horizontal direction and by Φ in the vertical direction (in formula (5) and (6), Φ=0). Further, the formulas that calculate the position and orientation of the reference viewpoint after the viewpoint operation are not limited to these. Furthermore, the change in the viewpoint is not limited to rotation, and may also be translation that changes the position without changing the orientation of the viewpoint, and the like. That is, in a case where the user operation for moving the virtual camera is performed, it may also be possible to translate a plurality of virtual cameras corresponding to a plurality of virtual viewpoint images in an interlocking manner. Similarly, in response to the user operation, it may also be possible to change the orientations of a plurality of virtual cameras in an interlocking manner without changing the positions.

As above, the position and orientation of the reference viewpoint after the viewpoint operation are calculated. That is, in the use example described above, in the virtual viewpoint video image 501 in FIG. 5C, the virtual viewpoint information on the virtual viewpoint video image 501 (FIG. 5D) after being operated with the finger 507 is calculated.

Following the above, the multi-viewpoint information calculation unit 603 develops the viewpoint operation at the reference viewpoint in another virtual viewpoint video image. That is, by using the viewpoint operation information on the reference virtual camera, the virtual viewpoint information on another virtual camera is calculated.

As explained in the use example in FIG. 5A to FIG. 5D described above, in the present embodiment, it is supposed that a viewer operates the viewpoint of another virtual camera (performs interlocking) after operating the reference viewpoint. Because of this, at the time of the operation of the reference viewpoint by a viewer, there is a possibility that the gaze point of the reference viewpoint and the gaze point of another virtual camera do not coincide accurately.

Consequently, it is necessary to cause the gaze point of another virtual camera to coincide with the gaze point of the reference viewpoint before developing the viewpoint operation of the reference viewpoint in the viewpoint of another virtual camera. The multi-viewpoint information calculation unit 603 changes the orientation of the viewpoint of another virtual camera in order to cause the gaze points to coincide with each other.

An orientation $tmpP'_{i-1}$ obtained by changing an orientation $P'_{i-1}$ before the viewpoint operation of another virtual camera so that the gaze point of the reference viewpoint and the gaze point of another virtual camera coincide with each other is expressed as the following formulas. Here, by the change in the orientation for causing the gaze points to coincide with each other, the viewpoint position is not moved (changed), and therefore, $t'_{i-1}$ is the position of another virtual camera before the viewpoint operation.

$$C' = C \qquad \text{formula (7)}$$

$$P'_{i-1} = [a_1 a_2 a_3] \qquad \text{formula (8)}$$

$$b_1 = C' - t'_{i-1} \qquad \text{formula (9)}$$

$$b_2 = a_2 \times b_1 \qquad \text{formula (10)}$$

$$b_3 = b_1 \times b_2 \qquad \text{formula (11)}$$

$$tmpP'_{i-1} = [b_1 b_2 b_3] \qquad \text{formula (12)}$$

By the above formulas, it is possible to calculate the orientation $tmpP'_{i-1}$ that maintains the vertical direction of the camera before the viewpoint operation by taking the gaze point as the above-described rotation base point. Further, an orientation $P'_i$ and a position $t'_i$ of the virtual viewpoint in another virtual viewpoint video image after the viewpoint operation in which the orientation $tmpP'_{i-1}$ and the position which are calculated here, are rotated by $\theta'$ only in the horizontal direction with a rotation base point C' as a center are expressed as the following formulas.

$$\theta' = \theta \qquad \text{formula (13)}$$

$$t'_i = R(\theta', O)(t'_{i-1} - C') + C' \qquad \text{formula (14)}$$

$$P'_i = R(\theta, O) tmpP'_{i-1} \qquad \text{formula (15)}$$

In the above formulas, the rotation base point C' and the rotation amount $\theta'$ are not calculated for each virtual camera but are calculated for the reference viewpoint. Due to this, even in a case where the object located at the image center before the viewpoint operation is different between the reference viewpoint and the viewpoint of the virtual camera in another virtual viewpoint image, after the viewpoint operation, it is possible to arrange the same object at the image center at the reference viewpoint and the viewpoint of the virtual camera in another virtual viewpoint image. The multi-viewpoint information calculation unit 603 outputs the plurality of pieces of calculated virtual viewpoint information to the drawing unit 206.

As explained above, according to the display control apparatus according to the present embodiment, it is possible for a viewer to easily specify the position and the orientation of the virtual camera in a plurality of virtual viewpoint video images. Specifically, it is possible for a viewer to interlock the viewpoint operation of another virtual camera in response to the viewpoint operation of the reference viewpoint in a plurality of displayed virtual viewpoint video images.

The method of interlocking the viewpoint operation of another virtual camera in response to the viewpoint operation of the reference viewpoint is not limited to that described above. Consequently, for example, in view of the difference between the display position of the reference virtual viewpoint video image and the display position of another virtual viewpoint video image as an offset after modifying the gaze point of another virtual camera, it may also be possible to interlock (control) the viewpoint operation of another virtual camera in response to the viewpoint operation of the reference viewpoint.

Second Embodiment

In the above-described first embodiment, the example is explained in which a plurality of virtual viewpoint video images is displayed at the same time in the same scene and the viewpoint of another virtual camera is controlled by (interlocked with) the viewpoint operation for one of the displayed virtual viewpoint video images. Due to this, it is possible for a viewer to easily specify the position and the orientation of the virtual viewpoint in the plurality of virtual viewpoint video images and improvement of the degree of understanding of the entire scene by a viewer is implemented. However, in the above-described first embodiment, as regards the same object, the size ratio before and after the viewpoint operation at the reference viewpoint and the size ratio before and after the viewpoint operation at the viewpoint of another virtual camera change.

Consequently, in the present embodiment, the virtual viewpoint information on the viewpoints other than the reference viewpoint is corrected after the calculation of the viewpoint information so that the size ratio of the same object is substantially the same before and after the viewpoint operation at the reference viewpoint and at the viewpoint of another virtual camera. In the following, by using FIG. 8 and FIG. 9, processing performed in the display control apparatus according to the present embodiment is explained by mainly focusing attention on differences from the first embodiment.

Figure 8:
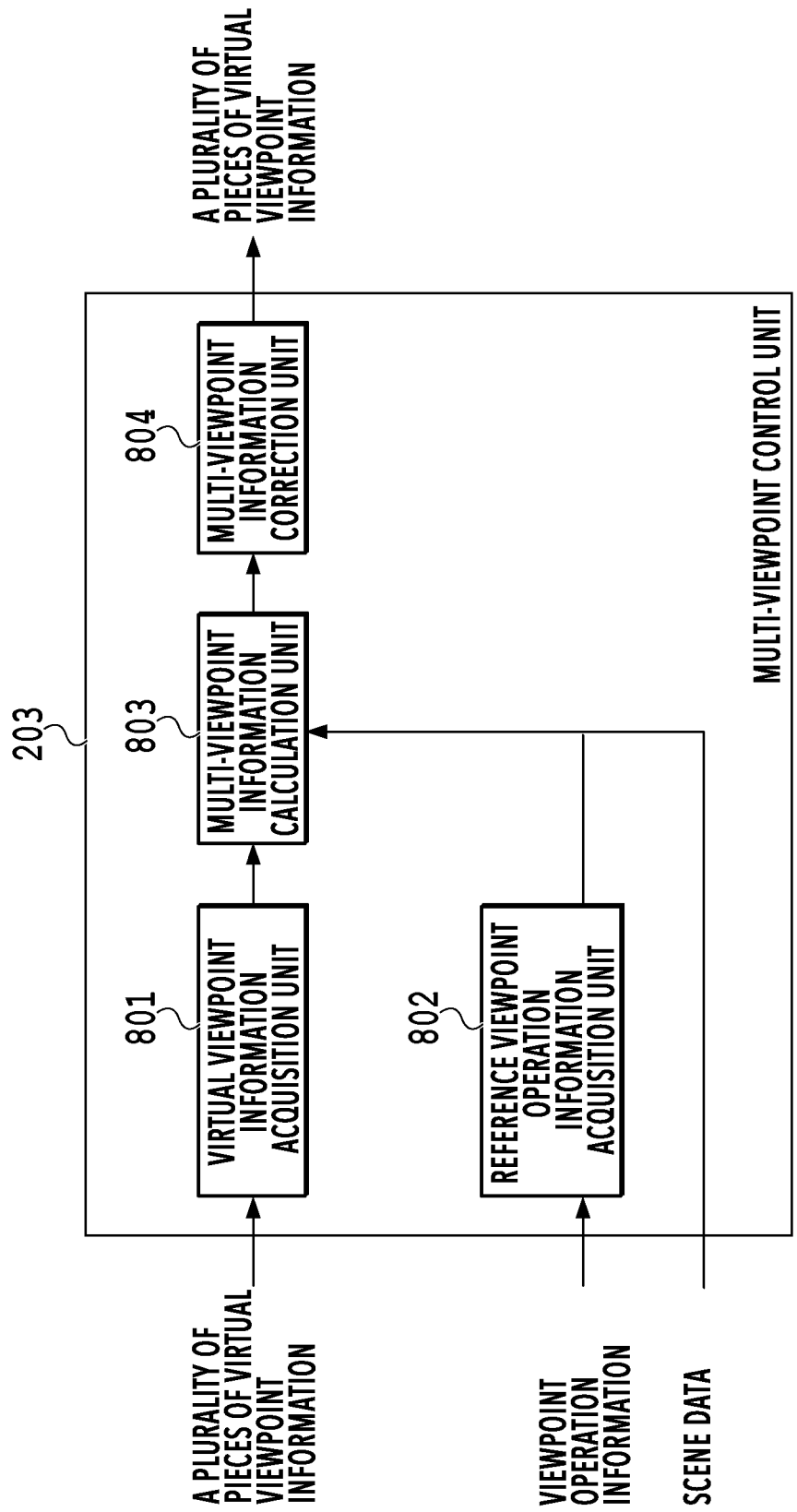
FIG. 8 is a diagram showing a function configuration of the multi-viewpoint control unit.
Figure 9:
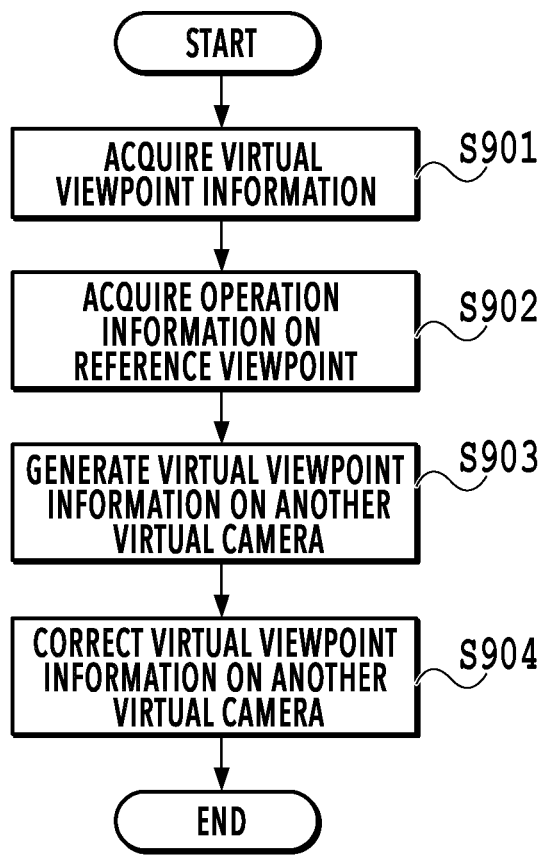
FIG. 9 is flowchart showing a procedure of processing to generate virtual viewpoint information on another virtual camera.

FIG. 8 is a diagram showing the function configuration of the multi-viewpoint control unit 203 and FIG. 9 is a flowchart showing the procedure of the processing at S304. In FIG. 9, the processing at 901 to S903 is the same as that in the first embodiment. In a case where the processing at S903 is performed, the virtual viewpoint information on all the virtual viewpoints before the viewpoint operation, the virtual viewpoint information on the reference viewpoint after the viewpoint operation, and the virtual viewpoint information on another virtual camera after the viewpoint operation, which is calculated based on the viewpoint operation at the reference viewpoint, are output to a multi-viewpoint information correction unit 804.

At S904, the multi-viewpoint information correction unit 804 acquires a plurality of pieces of virtual viewpoint information before and after the viewpoint operation and corrects the virtual viewpoint information on another virtual camera other than the reference viewpoint based on the acquired plurality of pieces of virtual viewpoint information before and after the viewpoint operation.

Specifically, in order to maintain the size ratio of the same object, a scale S that satisfies the following formula is calculated and the focal length included in the virtual viewpoint information (internal parameter) on another virtual camera is multiplied by the calculated scale S. Here, an example is explained in which the size ratio before and after the viewpoint operation at the reference viewpoint and the size ratio before and after the viewpoint operation at the viewpoint of another virtual camera are maintained for the object located at the rotation base point C as the same object.

In the following formula, the left side indicates the size ratio of the object before and after the viewpoint operation at the reference viewpoint and the right side indicates the size ratio of the object before and after the viewpoint operation at the viewpoint of another virtual camera. Further, in the following formula, $f_{i-1}$ is the focal length of the virtual viewpoint before the viewpoint operation, $f_i$ is the focal length of the reference viewpoint after the viewpoint operation, $f'_{i-1}$ is the focal length of another virtual camera before the viewpoint operation, and $f'_i$ is the focal length of another virtual camera after the viewpoint operation.

$$\frac{f_{i-1}}{|C - t_{i-1}|} : \frac{f_i}{|C - t_i|} = \frac{f'_{i-1}}{|C' - t'_{i-1}|} : \frac{S * f'_i}{|C' - t'_i|} \qquad \text{formula (16)}$$

The multi-viewpoint information correction unit 804 causes the size ratios of the same object to coincide with each other before and after the viewpoint operation at the reference viewpoint and the viewpoint of another virtual camera by correcting the virtual viewpoint information on another virtual camera by multiplying the focal length of the virtual camera by the scale S calculated by the above formula. In the present embodiment, in order to cause the size ratios of the same object to coincide with each other before and after the viewpoint operation, the focal length of another virtual camera is corrected, but the parameter that is corrected is not limited to the focal length and for example, it may also be possible to correct the position parameter of the virtual camera.

Third Embodiment

In the first embodiment and the second embodiment described above, the case is explained where the same object is viewed from the reference viewpoint and another virtual camera. That is, in the first embodiment and the second embodiment described above, on the premise that the object is the same, for example, explanation is given on the assumption that the rotation base point or the like, which is used for the viewpoint operation, is also the same for the reference viewpoint and another virtual camera. In the present embodiment, a case is explained where different objects are viewed from the reference viewpoint and another virtual camera. In the following, by using FIG. 10 and FIG. 11, processing performed in the display control apparatus according to the present embodiment is explained by mainly focusing attention on differences from the first embodiment.

Figure 10:
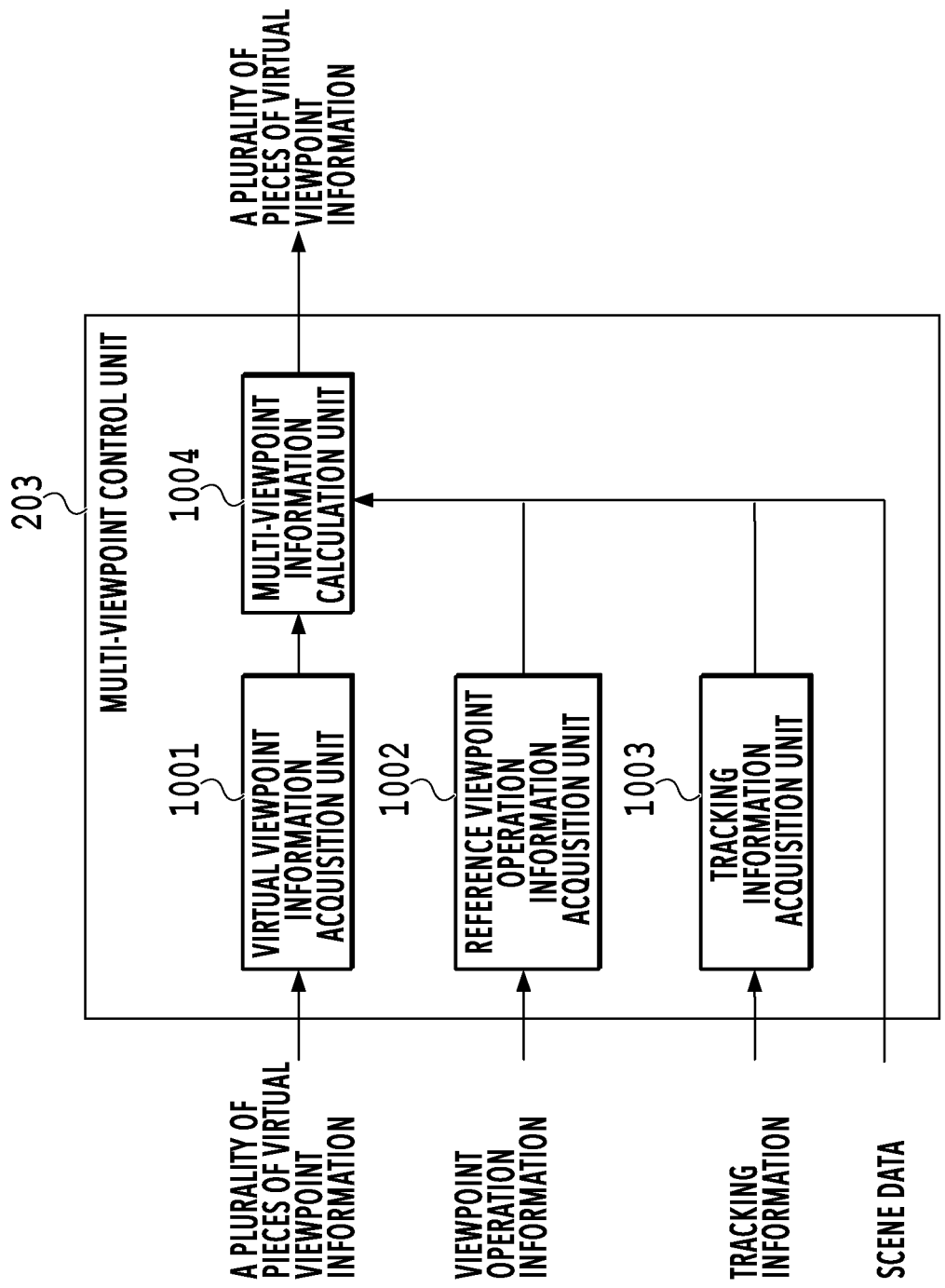
FIG. 10 is a diagram showing a function configuration of the multi-viewpoint control unit.
Figure 11:
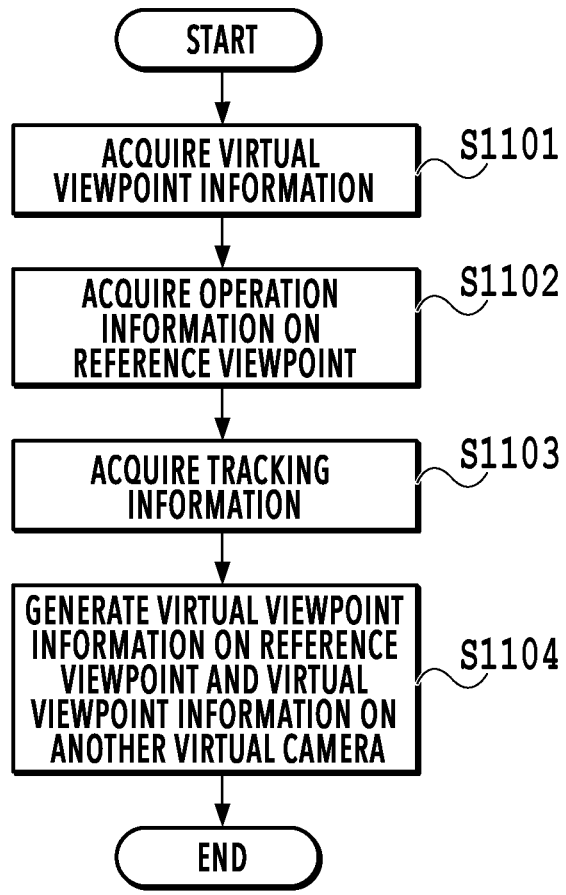
FIG. 11 is a flowchart showing a procedure of processing to generate virtual viewpoint information on another virtual camera.

FIG. 10 is a diagram showing the function configuration of the multi-viewpoint control unit 203 and FIG. 11 is a flowchart showing the procedure of the processing at S304. In FIG. 11, the processing at S1101 and S1102 is the same as that in the first embodiment.

At S1103, a tracking information acquisition unit 1003 acquires tracking information on the object within the scene. Here, the tracking information on the object includes positional information recording at which position within the world coordinate space each object within the scene is located in a plurality of frames configuring the scene.

In the present embodiment, it is assumed that a centroid position $X_{n,\ m}=[x_{n,\ m},\ y_{n,\ m},\ z_{n,\ m}]$ of an object whose identification number is n in a frame m is acquired as the tracking information. The tracking information does not necessarily need to be the centroid position and it may also be possible to acquire a plurality of positions of the object end portions. The tracking information acquisition unit 1003 outputs the acquired tracking information to a multi-viewpoint information calculation unit 1004.

At S1104, the multi-viewpoint information calculation unit 1004 calculates (generates) anew and updates the virtual viewpoint information on the reference viewpoint and the virtual viewpoint information on another virtual camera based on the virtual viewpoint information, the reference viewpoint operation information, and the tracking information. Here, the difference from the first embodiment lies in that the rotation base points C and C' are taken as the centroid positions of the objects at which each virtual camera gases (that is, the objects located in the vicinity of the image center of the virtual viewpoint image). In a case where it is assumed that the object at which the reference viewpoint gazes has an object identification number 1 and the object at which another virtual camera gazes has an object identification number 2, the rotation base point C of the reference viewpoint and the rotation base point C' of the viewpoint of another virtual camera are expressed as the following formulas.

$$C=X_{1,j-1} \quad \text{formula (17)}$$

$$C'=X_{2,j-1} \quad \text{formula (18)}$$

Then, by setting the rotation base point of the reference viewpoint and the rotation base point of another virtual camera to the mathematical equation explained in the first embodiment, even in a case where the reference viewpoint and another virtual camera gaze at different objects, it is possible to generate the virtual viewpoint video image with each object as a center. That is, according to the present embodiment, the plurality of virtual viewpoints including a first virtual viewpoint and a second virtual viewpoint is controlled so that a change in the position of the first virtual viewpoint for a first object within a three-dimensional space and a change in the position of the second virtual viewpoint for a second object within the three-dimensional space correspond to each other.

In the present embodiment, explanation is given by using the centroid position of the object that is gazed at as the rotation base point, but the present embodiment is not limited to this and it may also be possible to find and use the rotation base points of the reference viewpoint and another virtual camera by using the method of finding the rotation base point of the reference viewpoint of the above-described first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the embodiments described above, it is possible to improve convenience of a user relating to specification of a plurality of virtual viewpoints corresponding to a plurality of virtual viewpoint images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-074045, filed Apr. 9, 2019, which is hereby incorporated by reference wherein in its entirety.

What is claimed is:

1. An information processing apparatus comprising:
one or more processors configured to execute instructions stored in one or more memories to:
cause a display unit to simultaneously display a plurality of virtual viewpoint images, each of the plurality of virtual viewpoint images corresponding to one of a plurality of virtual viewpoints and being generated based on image data obtained by a plurality of image capturing apparatuses simultaneously performing image capturing from different directions;
receive an input for moving a position of a first virtual viewpoint and/or a view direction from the first virtual viewpoint in a first virtual viewpoint image of the plurality of virtual viewpoint images being simultaneously displayed on the display unit; and
perform, based on the received input for moving the position of the first virtual viewpoint and/or the view direction from the first virtual viewpoint in the first virtual viewpoint image of the plurality of virtual viewpoint images simultaneously displayed on the display unit, (i) control to move the position of the first virtual viewpoint and/or the view direction from the first virtual viewpoint corresponding to the first virtual viewpoint image of the plurality of virtual viewpoint images being simultaneously displayed on the display unit and (ii) control to move a position of a second virtual viewpoint and/or a view direction from the second virtual viewpoint corresponding to a second virtual viewpoint image of the plurality of virtual viewpoint images being simultaneously displayed on the display unit when the input for moving the position of the first virtual viewpoint and/or the view direction from the first virtual viewpoint in the first virtual viewpoint image of the plurality of virtual viewpoint images being simultaneously displayed on the display unit is received.

2. The information processing apparatus according to claim 1, wherein the one or more processors are configured to execute the instructions stored in the one or more memories to move the position of the first virtual viewpoint and the position of the second virtual viewpoint so that a move in the position of the first virtual viewpoint relative to a reference position within a three-dimensional space and a move in the position of the second virtual viewpoint relative to the reference position correspond to each other.

3. The information processing apparatus according to claim 2, wherein the reference position is a three-dimensional position of an object located at a center of the first virtual viewpoint image corresponding to the first virtual viewpoint.

4. The information processing apparatus according to claim 3, wherein the one or more processors are configured to execute the instructions stored in the one or more memories to control the second virtual viewpoint so that the object is located at a center of the second virtual viewpoint image corresponding to the second virtual viewpoint.

5. The information processing apparatus according to claim 1, wherein the one or more processors are configured to execute the instructions stored in the one or more memories to change the plurality of virtual viewpoints including the first virtual viewpoint and the second virtual viewpoint so that a size ratio of a specific object in the first virtual viewpoint image corresponding to the first virtual viewpoint before and after the first virtual viewpoint changes in response to the input and a size ratio of a specific object in the second virtual viewpoint image corresponding to the second virtual viewpoint before and after the second virtual viewpoint changes in response to the input correspond to each other.

6. The information processing apparatus according to claim 1, wherein the one or more processors are configured to execute the instructions stored in the one or more memories to change the plurality of virtual viewpoints including the first virtual viewpoint and the second virtual viewpoint so that a change in the position of the first virtual viewpoint relative to a first object within a three-dimensional space and a change in the position of the second virtual viewpoint relative to a second object within the three-dimensional space correspond to each other.

7. The information processing apparatus according to claim 6, wherein the first object is an object located at a center of the first virtual viewpoint image corresponding to the first virtual viewpoint and the second object is an object located at a center of the second virtual viewpoint image corresponding to the second virtual viewpoint.

8. The information processing apparatus according to claim 1, wherein
the one or more processors are configured to execute the instructions stored in the one or more memories to further acquire viewpoint information indicating a magnitude of a viewing angle corresponding to a virtual viewpoint,
wherein a plurality of positions of the plurality of virtual viewpoints and/or a plurality of view directions from the plurality of virtual viewpoints respectively corresponding to the plurality of virtual viewpoint images indicated by the acquired viewpoint information are moved based on the received input.

9. The information processing apparatus according to claim 1, wherein the one or more processors are configured to execute the instructions stored in the one or more memories to further determine, based on a user operation, whether to move a plurality of positions of the plurality of virtual viewpoints and/or a plurality of view directions from the plurality of virtual viewpoints based on the received input or to move only the position of the first virtual viewpoint and/or the view direction from the first virtual viewpoint in the first virtual viewpoint image based on the received input.

10. The information processing apparatus according to claim 9, wherein the one or more processors are configured to execute the instructions stored in the one or more memories to cause the display unit to display an image for causing a user to select whether to move the plurality of positions of the plurality of virtual viewpoints and/or the plurality of view directions from the plurality of virtual viewpoints based on the received input or to move only the position of the first virtual viewpoint and/or the view direction from the first virtual viewpoint in the first virtual viewpoint image.

11. The information processing apparatus according to claim 1, wherein the one or more processors are configured to execute the instructions stored in the one or more memories to cause the display unit to display, in a first area of the display unit, the first virtual viewpoint image of the plurality of virtual viewpoint images and to display, in a second area of the display unit, the second virtual viewpoint image of the plurality of virtual viewpoint images.

12. The information processing apparatus according to claim 11, wherein the one or more processors are configured to execute the instructions stored in the one or more memories to move the position of the first virtual viewpoint and/or the view direction from the first virtual viewpoint in the first virtual viewpoint image that is displayed in the first area and the position of the second virtual viewpoint and/or the view direction from the second virtual viewpoint in the second virtual viewpoint image that is displayed in the second area in response to a touch operation received in the first area.

13. The information processing apparatus according to claim 12, wherein the one or more processors are configured to execute the instructions stored in the one or more memories to move the position of the first virtual viewpoint and/or the view direction from the first virtual viewpoint in the first virtual viewpoint image that is displayed in the first area and the position of the second virtual viewpoint and/or the view direction from the second virtual viewpoint in the second virtual viewpoint image that is displayed in the second area in response to a touch operation received in the second area.

14. An information processing method comprising:
displaying a plurality of virtual viewpoint images, each of the plurality of virtual viewpoint images corresponding to one of a plurality of virtual viewpoints, simultaneously on a display unit, each of the plurality of virtual viewpoint images being generated based on image data obtained by a plurality of image capturing apparatuses simultaneously performing image capturing from different directions;
receiving an input for moving a position of a first virtual viewpoint and/or a view direction from the first virtual viewpoint in a first virtual viewpoint image of the plurality of virtual viewpoint images being simultaneously displayed on the display unit; and
performing, based on the received input for moving the position of the first virtual viewpoint and/or the view direction from the first virtual viewpoint in the first virtual viewpoint image of the plurality of virtual viewpoint images simultaneously displayed on the display unit, (i) control to move the position of the first virtual viewpoint and/or the view direction from the first virtual viewpoint corresponding to the first virtual viewpoint image of the plurality of virtual viewpoint images being simultaneously displayed on the display unit and (ii) control to move a position of a second virtual viewpoint and/or a view direction from the second virtual viewpoint corresponding to a second virtual viewpoint image of the plurality of virtual viewpoint images being simultaneously displayed on the display unit when the input for moving the position of the first virtual viewpoint and/or the view direction from the first virtual viewpoint in the first virtual viewpoint image of the plurality of virtual viewpoint images being simultaneously displayed on the display unit is received.

15. The information processing method according to claim 14, further comprising:
determining, based on a user operation, whether to move a plurality of positions of the plurality of virtual viewpoints and/or a plurality of view directions from the plurality of virtual viewpoints based on the received input or to move only the position of the first virtual viewpoint and/or the view direction from the first virtual viewpoint in the first virtual viewpoint image based on the received input.

16. The information processing method according to claim 14, wherein
in a first area of the display unit, the first virtual viewpoint image of the plurality of virtual viewpoint images is displayed, and in a second area of the display unit, the second virtual viewpoint image of the plurality of virtual viewpoint images is displayed,
the position of the first virtual viewpoint and/or the view direction from the first virtual viewpoint in the first virtual viewpoint image that is displayed in the first area and the position of the second virtual viewpoint and/or the view direction from the second virtual viewpoint in the second virtual viewpoint image that is displayed in the second area are moved in response to a touch operation received in the first area, and
the position of the first virtual viewpoint and/or the view direction from the first virtual viewpoint in the first virtual viewpoint image that is displayed in the first area and the position of the second virtual viewpoint and/or the view direction from the second virtual viewpoint in the second virtual viewpoint image that is displayed in the second area are moved in response to a touch operation received in the second area.

17. A non-transitory computer readable storage medium storing a program for causing a computer to perform an information processing method comprising:
displaying a plurality of virtual viewpoint images, each of the plurality of virtual viewpoint images corresponding to one of a plurality of virtual viewpoints, simultaneously on a display unit, each of the plurality of virtual viewpoint images being generated based on image data obtained by a plurality of image capturing apparatuses simultaneously performing image capturing from different directions;
receiving an input for moving a position of a first virtual viewpoint and/or a view direction from the first virtual viewpoint in a first virtual viewpoint image of the plurality of virtual viewpoint images being simultaneously displayed on the display unit; and
performing, based on the received input for moving the position of the first virtual viewpoint and/or the view direction from the first virtual viewpoint in the first virtual viewpoint image of the plurality of virtual viewpoint images simultaneously displayed on the display unit, (i) control to move the position of the first virtual viewpoint and/or the view direction from the first virtual viewpoint corresponding to the first virtual viewpoint image of the plurality of virtual viewpoint images being simultaneously displayed on the display unit and (ii) control to move a position of a second virtual viewpoint and/or a view direction from the second virtual viewpoint corresponding to a second virtual viewpoint image of the plurality of virtual viewpoint images being simultaneously displayed on the display unit when the input for moving the position of the first virtual viewpoint and/or the view direction from the first virtual viewpoint in the first virtual viewpoint image of the plurality of virtual viewpoint images being simultaneously displayed on the display unit is received.

* * * * *